(12) United States Patent
Zhou et al.

(10) Patent No.: US 7,185,024 B2
(45) Date of Patent: Feb. 27, 2007

(54) METHOD, COMPUTER PROGRAM PRODUCT, AND SYSTEM OF OPTIMIZED DATA TRANSLATION FROM RELATIONAL DATA STORAGE TO HIERARCHICAL STRUCTURE

(75) Inventors: Nianjun Zhou, Somers, NY (US); George Andrei Mihaila, Yorktown Heights, NY (US); Dikran S. Meliksetian, Danbury, CT (US); Sriram Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/744,424

(22) Filed: Dec. 22, 2003

(65) Prior Publication Data
US 2005/0138073 A1 Jun. 23, 2005

(51) Int. Cl.
*G06F 17/30* (2006.01)
(52) U.S. Cl. .................................. 707/104.1
(58) Field of Classification Search ............... 707/1, 707/2, 3, 100, 104.1; 709/224
See application file for complete search history.

(56) References Cited
U.S. PATENT DOCUMENTS
6,785,673 B1 * 8/2004 Fernandez et al. ............. 707/3
6,889,226 B2 * 5/2005 O'Neil et al. ............... 707/100
2004/0199524 A1 * 10/2004 Rys et al. ................... 707/100

OTHER PUBLICATIONS

Shanmugasundaram, Jayavel et al. "Querying XML Views of Relational Data". IBM Almaden Research Center. Proceedings of the 27th VLDB Conference, Roma, Italy, 2001.
Shanmugasundaram, Jayavel et al. "Efficiently Publishing Relational Data as XML Documents". IBM Almaden Research Center. Proceedings of the 26th International Conference on Very Large Databases, Cairo, Egypt, 2000.

* cited by examiner

*Primary Examiner*—Etienne P LeRoux
(74) *Attorney, Agent, or Firm*—John E. Campbell; Jeffrey N. Giunta; Fleit, Kain, Gibbons, Gutman, Bongini & Bianco P.L.

(57) ABSTRACT

A tagging tree that defines a hierarchical output data structure and relational database query operations that retrieve the data to be included in each hierarchical section is accepted and processed. A query optimizer analyzes the tagging tree to determine database query operations that can be combined into a single query command. An outer-union query command is generated to allow efficient combination of multiple query commands, some of which are predicates to others. The tagging tree is modified to replace the database queries that were combined into the outer-union query to extract data from the results set produced by the outer-union query as opposed to submitting queries to the database manager. The optimized queries can be reused an arbitrary number of times to leverage the optimizing resources that were used in their creation.

17 Claims, 8 Drawing Sheets

EXEMPLARY PARAMETERIZED SQL QUERY Qm HAS THE FORM:

SELECT Cm1, Cm2, ..., Cmkm
    FROM Tk
    WHERE Pm1 ... Pmp1

EXEMPLARY BINDING OBJECTS Bm HAS THE FORM:

(m, Cmq); $0 \leq q \leq$ Number of '?' In query Qm

EXEMPLARY SINGLE OUTER-UNION SQL QUERY:

WITH temp (QID, X1_C11, X1_C12, ,..., X1_C1k1, X2_C21, , X2_C22, ..., ,
    X3_C3k3,....., , XN_CN1, , XN_CN2, ....,, XN_CNkN) AS {
      SELECT 1, C11, , C12, ,... , C1k1, NULL, ..., NULL
      FROM T1
      WHERE P'11 op ... P'1p1
    UNION ALL
      SELECT 2, NULL, ..., NULL, C21, , C22, ,... , C2k2, NULL, ..., NULL
      FROM T1, T2
      WHERE P'11 op ... P'1p1 AND P'21 op ... P'2p2
    ...
    } SELECT * FROM temp ORDER BY X1_C1i1, X2_C2i2, ..., XN_CNiN, QID

Q1 = select id, buyer, seller from po —140
Q2 = select name, price form lineitem where poid = ? —142

Q3 = with temp (qid, po_id, po_buyer, po_seller, item_name, item_price) as (
   select 1, id, buyer, seller, null, null from po
union all
   select 2, id, null, null, name, price
   from po, lineitem where poid = id)
select * from temp order by po_id, qid

| Qid | po_id | po_buyer | po_seller | item_name | item_price |
|-----|-------|----------|-----------|-----------|------------|
| 1 | 100 | Compaq | Intel | null | null —1116 |
| 2 | 100 | null | null | chip 1 | 40 —1118 |
| 2 | 100 | null | null | chip 2 | 90 —1120 |

METHOD, COMPUTER PROGRAM PRODUCT, AND SYSTEM OF OPTIMIZED DATA TRANSLATION FROM RELATIONAL DATA STORAGE TO HIERARCHICAL STRUCTURE

BACKGROUND OF THE INVENTION

1. Field of the Invention

This invention relates to database query techniques and more specifically to optimizing data transformation from relational databases to hierarchical structures.

2. Background of the Invention

Data sets are frequently communicated or delivered in hierarchical data structures. Such hierarchical data structures can be stored in structured documents, such as extensible Markup Language (XML) documents. XML documents, for example, are widely accepted by various processing programs and data exchange systems, wherein the data in the XML document is used directly or transformed into a data structure used by the receiving program or system.

In contrast to the communications and delivery of data, database systems are generally used to store and manipulate data. Relational database systems are a popular type of database system due to the many widely known benefits to storing and manipulating data stored in relational databases. Relational databases are generally maintained by software systems that are referred to as Relational Database Management Systems (RDBMS). RDBMSs are generally able to be distributed among two or more computer nodes that are able to be physically and even geographically separated. An enterprise is also able to distribute data among multiple RDBMSs that are hosted on different computers and retrieval of a complete set of data for a particular request in such enterprises then requires access to the multiple RDBMSs. This can consume significant computing and communications resources.

A common data manipulation process is the publishing of data out of a database in an XML format. Retrieving the data from the relational database and delivering that data in a hierarchical structure format, such as in an XML document, results in inefficiencies. Such operations typically begin with a definition of the hierarchical data structure to be produced, and an identification of data to be retrieved from one or more RDBMSs is then associated with each node of that hierarchical data structure definition. Retrieval of data from the relational database often requires a first query to determine the parameters of other queries required for the hierarchical data output. For example, retrieving a list of salaries for all employees in a particular department requires first retrieving the list of employees in that department, and then forming a query operation for the salaries for those employees.

RDBMSs, particularly RDBMSs that are used to maintain complex data sets, generally consume significant resources for each separate database query. Resource consumption for database queries is especially high when one or more database components are stored remotely and a remote query operation is required to retrieve some or all of the necessary data. The repetitive queries used to completely retrieve the data required for hierarchical output data can therefore result in large resource consumption.

In order to allow more efficient publication of data from a relational database to a hierarchical data structure, a more efficient way to retrieve data required to create hierarchical data structures from data contained in relational databases is needed.

SUMMARY OF THE INVENTION

Briefly, in accordance with the present invention, a method for transferring data from a database into a hierarchical structure includes accepting a tagging tree that has: at least one tagging node that each specifies a field in a hierarchical structure, a plurality of execution nodes that each specifies a database query command for at least one data object, and at least one data node that each specifies a binding between each of the at least one data object and at least one field specified in the at least one tagging node. The method further includes combining at least two of the plurality of execution nodes into at least one composite database query. Each of the at least one composite database query specifies the same data source. The method further includes executing the single database query to retrieve a set of data objects and creating an output having a composite hierarchical structure with a plurality of fields. The output is created by placing at least one data object within the set of data objects into at least one field of the plurality of fields based upon the at least one data node.

In another aspect of the present invention, a hierarchical data structure generator for transferring data from a database into a hierarchical structure has a analyze tagging tree processor that accepts a tagging tree. The tagging tree consists of at least: one tagging node that each specifies a field in a hierarchical structure, a plurality of execution nodes that each specifies a database query command for at least one data object, and at least one data node that each specifies a binding between each of the at least one data object and at least one field specified in the at least one tagging node. The hierarchical data structure generator further has a composite query generator that combines at least two of the plurality of execution nodes into at least one composite database query. Each of the at least one composite database query specifies the same data source. The hierarchical data structure generator further has a runtime engine for executing the single database query to retrieve a set of data objects and an extract and tag data processor for creating an output having a composite hierarchical structure with a plurality of fields. The output is created by placing at least one data object within the set of data objects into at least one field of the plurality of fields based upon the at least one data node.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 5 illustrates an exemplary parameterized SQL query format as used within an exemplary embodiment of the present invention.

FIG. 6 illustrates an exemplary binding object format as used within an exemplary embodiment of the present invention.

FIG. 7 illustrates an outer union query format as is constructed and executed by an exemplary embodiment of the present invention.

FIG. 8 illustrates two exemplary single relational database queries used to retrieve data specified within the exemplary tagging tree shown in FIG. 1, according to an exemplary embodiment of the present invention.

FIG. 9 illustrates an outer union query format as is constructed from the two exemplary single relational database queries shown in FIG. 8, according to an exemplary embodiment of the present invention.

FIG. 11 illustrates an extracted sorted table produced as an output of the outer union query illustrated in FIG. 9, according to an exemplary embodiment of the present invention.

DETAILED DESCRIPTION OF THE EMBODIMENTS

Exemplary embodiments of the present invention utilize a convenient and efficient technique to retrieve data from a relational database and provide that data in a hierarchical structure, such as in an XML document that is defined by an XML Schema or Data Type Document (DTD). Exemplary embodiments of the present invention incorporate a "tagging tree." Various types of nodes and edges compose these tagging trees. A tagging tree can be created by parsing external scripts that use different notations, or a tagging tree can be constructed manually by invoking different node creation methods. After a tagging tree is created, the processing of the exemplary embodiments use a depth-first tree traversal algorithm to walk through the tagging tree, with inputs from end-users or other programs, to generate a specific XML document by retrieving data from one or more relational database systems. This depth-first tree transversal algorithm has two steps: 1) Information from the database(s) is retrieved using the SQL queries in the execution nodes, thereby creating an array of intermediate data sets; and 2) The data from the intermediate data sets is transformed into the required final output format such as an XML format, using format specified by the tagging tree.

Exemplary embodiments of the present invention generate and use an SQL sorted outer-union query to retrieve data from a Relational Database Management System. The outer-union query as used by exemplary embodiments of the present invention is defined for any two relations R(A1, . . . , An) and S(B1, . . . , Bm). The result of the outer-union is a relation T(ID, A1, . . . , An, B1, . . . , Bm) obtained by taking all the tuples from both relations and padding them with NULLs in the columns that correspond to (i.e., the columns that are in) the other relation. The sorted outer-union query, which is generated as described below, is advantageous for the operation of the exemplary embodiments because the output of the results set of this sorted outer-union query is in the order required for the output XML document.

An outer-union operation as used by exemplary embodiments of the present invention differs from the conventional SQL union operation in some respects. The conventional SQL union operation is only defined for relations having the same number and types of columns. The result of the conventional SQL union operation is also a relation with the same columns as the two relations involved having as tuples the set of all tuples from both relations, without any of the duplicate tuples that would otherwise exist in the results set.

Exemplary System Overview

Figure 1:
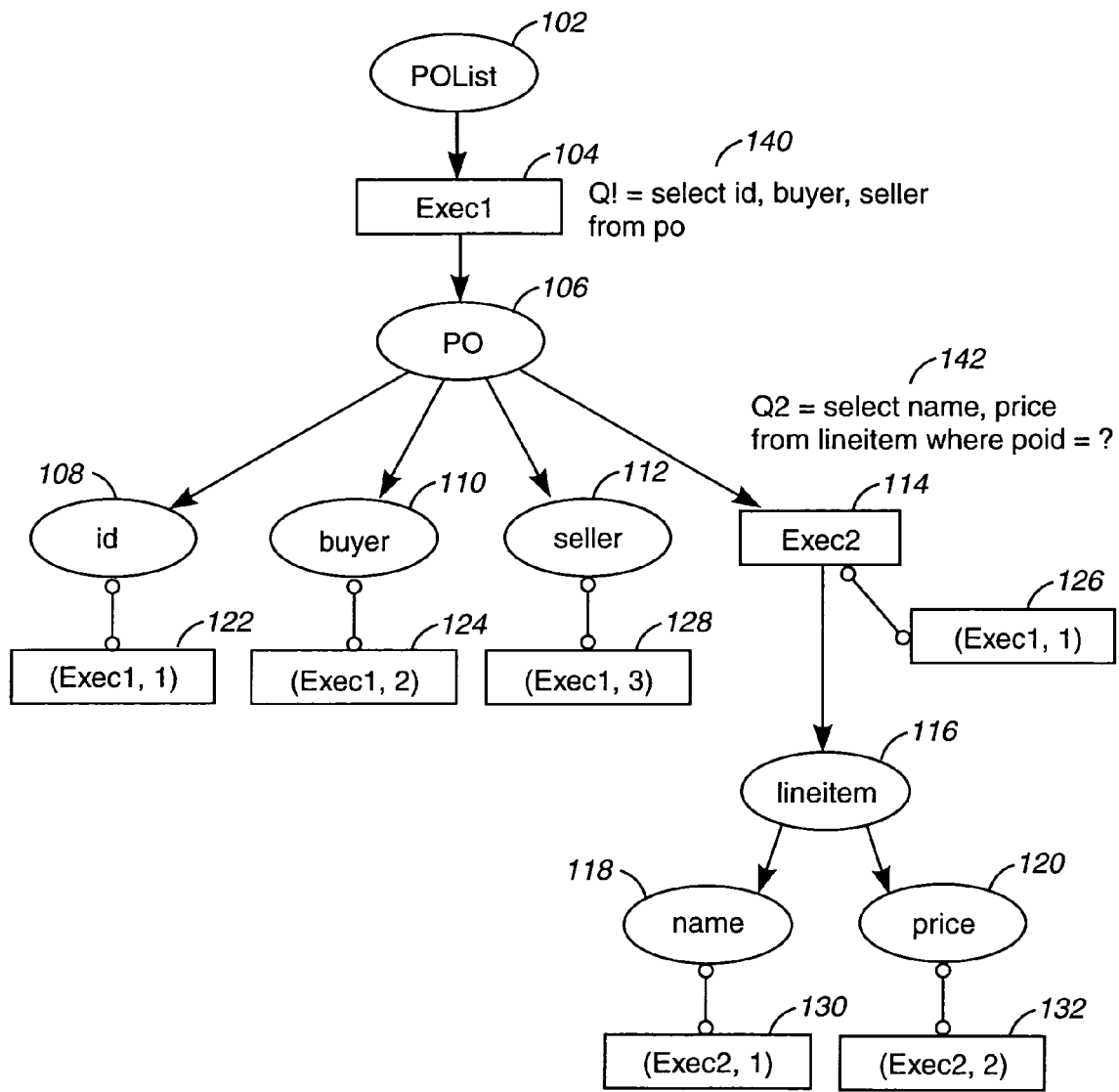
FIG. 1 is an exemplary tagging tree as is used to describe hierarchical data structures and associated data content according to an exemplary embodiment of the present invention.

An exemplary tagging tree 100 as is processed by an exemplary embodiment of the present invention, is illustrated in FIG. 1. Tagging trees as are used by the exemplary embodiments of the present invention have nodes that can be one of multiple node types that have been defined for a tagging tree. The various node types define the features of the transformation from a relational database to the hierarchical data structure of the XML output document. Examples of different node types are tagging node, execution node, and data nodes.

Tagging nodes specify the structure of the output hierarchical data structure, as reflected by a schema of the exemplary embodiment. Execution nodes in the exemplary embodiment contain a parameterized SQL SELECT query and a list of output column names. These SQL SELECT queries retrieve data for one or more particular nodes of the output hierarchical data structure. Data nodes provide bindings between the output of the SQL queries specified by the execution nodes and the specific data areas of the output hierarchical schema.

Each execution node in the exemplary embodiment is also bound to a specific data source, i.e., column name, through binding objects. Binding objects represents the data relationship between execution nodes and other nodes. Binding objects contain a binding of execution node and column name. An execution node can bind to multiple columns of its ancestor execution nodes.

The exemplary tagging tree 100 is identified as "POList" by the root node 102. The root node 102 is also a tagging node that specifies the top level tag to be provided in the output hierarchical data. The next node is an "Exec1" node 104, which is an execution node that has a first parameterized SQL SELECT command 140 as shown. The first parameterized SQL SELECT command 140 selects the "ID," "buyer," and "seller" columns from the table "po." The "PO" node 106 is a tagging node that identifies the tag to be used for the descendant leaves in that branch of the output hierarchical data structure tree. The "ID" node 108 is a tagging node that specifies a tag "ID," which is descendant to the tag "PO," to be provided for associated data in the output hierarchical data structure. The "(Exec1, 1)" node 122 is a data node that specifies that the data contained in the first column, as indicated by the "1" in the second parameter, of the result set returned by the query specified by the "Exec1" execution node 104 is to be inserted under the "ID" tag. The "buyer" node 110 and the "seller" node 112 are tag nodes that similarly identify hierarchical tags to be provided in the output hierarchical data structure for the data specified by the "(Exec1, 2)" data node 124 and the "(Exec1, 3)" data node 128, respectively. The "(Exec1, 2)" data node 124 specifies that the data contained in the second column of the result set returned by the query specified in the "Exec1" execution node 104 is to be provide under the associated "buyer" tag 110 in the output hierarchical data structure. The "(Exec1, 3)" data node 128 specifies that the data contained in the third column, as indicated by the "3" in the second parameter, of the result set returned by the query specified in the "Exec1" execution node 104 is to be provided under the associated "seller" tag 112 in the output hierarchical data structure.

The "Exec2" node 114 is an execution node that specifies a second database query that is defined by the second parameterized SQL SELECT command 142 as is shown. The position of the Exec2 node 114 under the PO node 106 indicates that data from the "Exec2" node 114 is to be inserted into nodes that are children of the "PO" tag in the output hierarchical data structure. The "Exec2" node 114 is associated with a second "(Exec1, 1)" node 126 that specifies that the data in the first column of the result set produced by the "Exec1" execution node is to be used in the SQL WHERE clause of the SELECT command specified in the "Exec2" execution node 114. This indicates that the data to be retrieved by the "Exec2" execution node 114 is dependent upon the data retrieved by the "Exec1" execution node 104. The data result set produced by the "Exec2" command node 114 is shown as connected to the "lineitem" tagging node 116, which indicates that the data produced by the "Exec2" execution node 114 is to be placed under a "lineitem" tag in the output hierarchical data structure.

The tagging tree 100 shows two tagging nodes, a "name" node 118 and a "price" node 120, that are descendants to the "lineitem" tagging node 116. The "name" node 118 is shown as associated with an "(Exec2, 1)" node 130, which indicates that the first column of the result set produced by the "Exec2" execution node 114 is to be provided under a "name" tag in the output hierarchical data structure. The "price" node 118 is similarly shown as associated with an "(Exec2, 2)" node 132, which indicates that the second column of the result set produced by the "Exec2" execution node 114 is to be provided under a "price" tag in the output hierarchical data structure.

Figure 2:
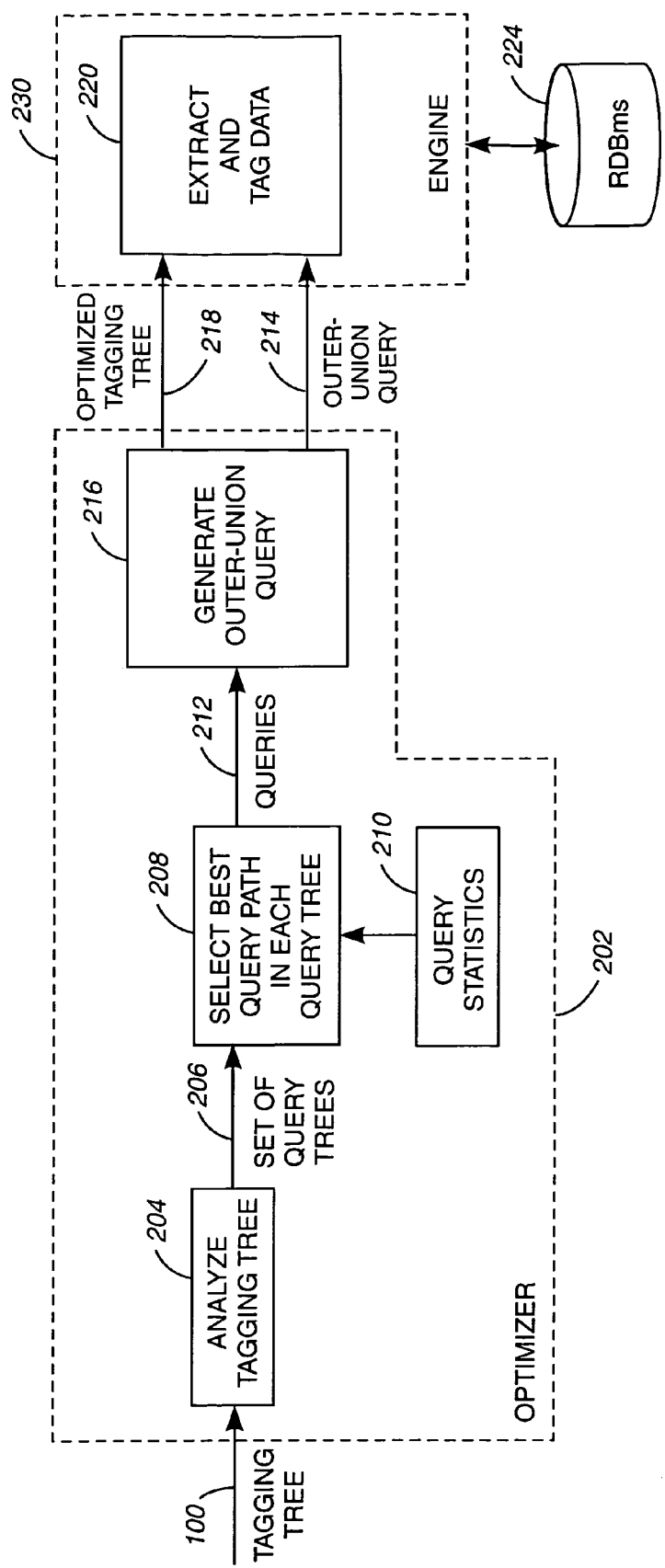
FIG. 2 illustrates a processing system architecture for a hierarchical data structure generator according to an exemplary embodiment of the present invention.
Figure 3:
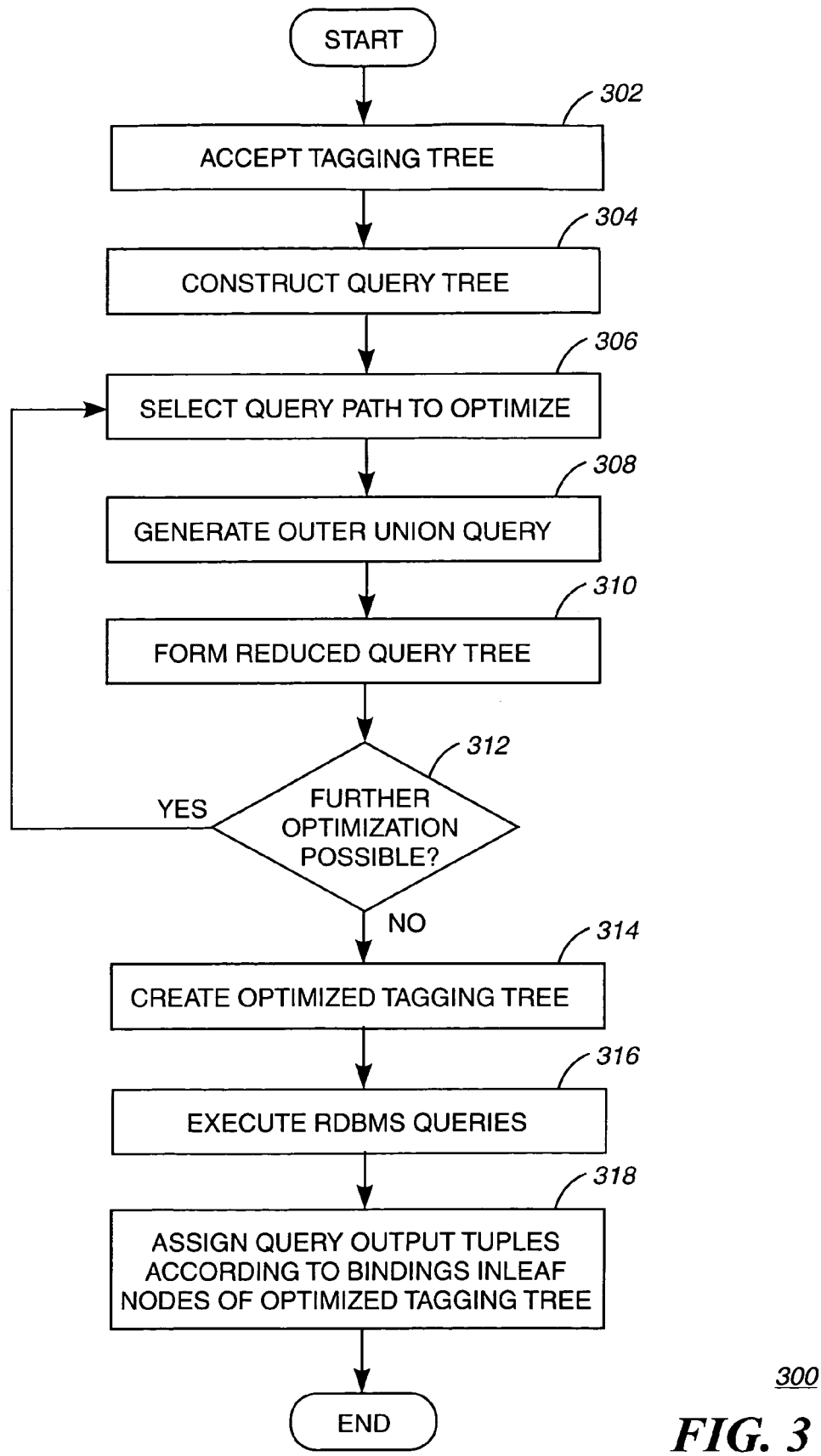
FIG. 3 illustrates a processing flow diagram for the hierarchical data structure generator illustrated in FIG. 2, according to an exemplary embodiment of the present invention.

A processing system architecture 200 and a top level processing flow diagram 300 of an exemplary embodiment of the present invention is illustrated in FIGS. 2 and 3, respectively. The processing system of the exemplary embodiment consists of three major processing components, a data retrieval optimizer 202, a hierarchical data structure generating engine 230 and a Relational Database Management System 224. The processing components illustrated in the processing system architecture 200 and the processing described in the top level processing flow diagram 300 of this exemplary embodiment are able to be hosted by a single processing system or distributed across multiple processing systems that are collocated or located at disperse geographic locations, as is commonly understood by practitioners in the relevant arts.

The processing of the exemplary embodiment accepts a tagging tree 100, at step 302, as an input. The tagging tree is first processed by an analyze tagging tree processor 204. The analyze tagging tree processor 204 of the exemplary embodiment receives a tagging tree 100 and creates, at step 304, a set of query trees that contains at least one query tree 206 therefrom. A query tree 206, as used by the exemplary embodiment of the present invention, is a tree structure that is configured with parent child relationships similar to the hierarchical structure of the tagging tree 100. In effect, the query tree is a tree that contains only the execution nodes of the received tagging tree. Each of execution node within query trees within the set of query trees generated by the analyze tagging tree processor 204 of the exemplary embodiment appears only once. The ancestor-descendant relationships of the execution nodes within the received tagging tree, as well as the binding relationships of the received tagging tree, are preserved in the query tree 206.

The query tree 206 is then processed by a select best query path processor 208 to determine which of the potentially multiple queries specified by the query tree can be optimized by being combined into a single outer-union query, as is described in detail below. The select best query path processor 208 uses statistics relating to query tasks to select which of any multiple candidate query paths are the most beneficial to optimize. Query statistics are stored in a query statistics storage 210 in the exemplary embodiment. Query statistics describe, for example, the processing resources that will be consumed by executing a database query, such as an SQL SELECT command. The query statistics storage 210 contains statistics generated and stored by the RDMBS 224. Statistics stored in the query statistics storage include data to allow an estimate of the size of a specific query result before that query result is executed. These estimates are used to identify which queries are best to combine into a sorted outer-union query.

The select best query path processor 208 of the exemplary embodiment selects, at step 306, one or more query paths to optimize and produces a set of parameterized SQL queries 212 that are to be combined into single outer-union queries, at step 308. The set of parameterized SQL queries 212 contains queries that can be combined into one or more single outer union queries, as is described in detail below. The generate outer-union query processor 216 of the exemplary embodiment is a composite query generator that produces single outer-union queries. These single outer-union queries as used by the exemplary embodiments are single, combined queries that are used to extract in a single RDBMS operation the data that is specified by multiple parameterized SQL queries.

Once a first query tree has been optimized by merging queries into a single outer-union query, the execution nodes that were not merged are then used to form, at step 310, a reduced query tree, as described in further detail below. These remaining execution nodes are then examined to determine, at step 312, if further optimization of the reduced query tree is possible. If further optimization is possible, processing returns to selecting, at step 306, a query path to optimize within the newly formed reduced query tree.

If the reduced query tree is not able to be further optimized, the tagging tree 100 that was received by the optimizer 202 is modified, at step 314, so as to extract data for some nodes from the single result set that is to be returned by the single outer-union query, as is described below. This modified tagging tree 218, along with the outer-union query 124, is produced by the generate outer-union query processor 216 of the exemplary embodiment. These are provided to the engine process 230. The runtime engine process 230 of the exemplary embodiment includes an extract and tag data processor 220. The runtime engine 230 of the exemplary embodiment executes upon database tables maintained by the RDBMS 224, at step 316, the SQL queries that are specified by the modified tagging tree 214. The extract and tag data processor 220 processes the data from single result sets produced by the single outer-union queries that were generated by the generate outer-union query processor 216 to extract data for inclusion into the output XML document. The processing of the exemplary embodiment assigns, at step 318, data tuples in the single result set produced by the single outer-union queries 214 to hierarchical fields within the output XML document according to bindings that are specified in leaf nodes of the optimized tagging tree. The processing of the extract and tag data processor of the exemplary embodiments inserts the data that was extracted from the RDMBS 224 into an XML document 222 for output from the system.

Query Tree Optimization Processing

Figure 4:
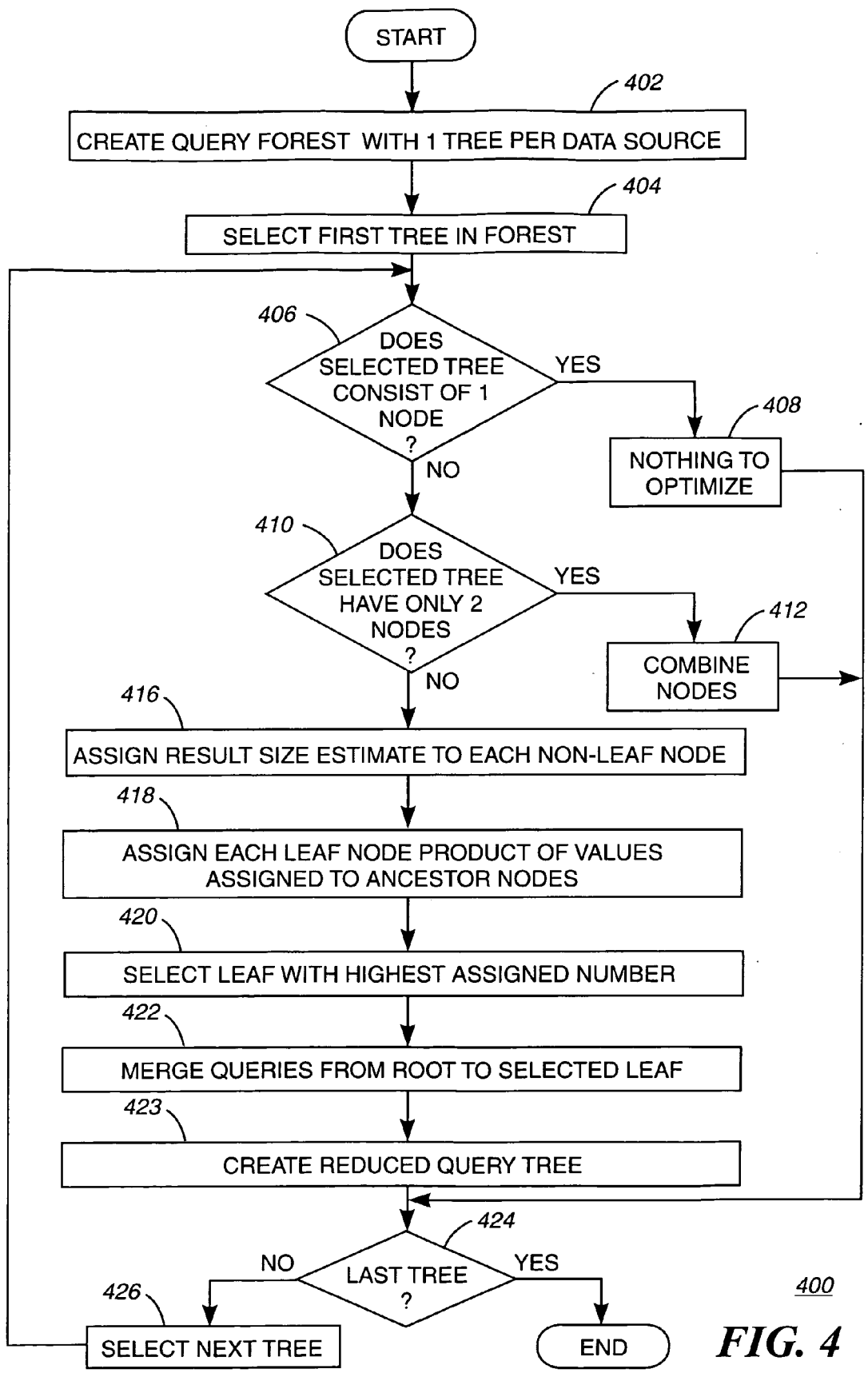
FIG. 4 illustrates a processing flow diagram for optimizing the combination of multiple queries into single combined queries, in accordance with an exemplary embodiment of the present invention.

A query tree optimization processing flow 400 as performed by an exemplary embodiment of the present invention is illustrated in FIG. 4. The query tree optimization processing flow 400 begins by creating, at step 402, from each original query tree 206 a query forest that is organized so as to have one separate query tree per data source. A data source in this context is a single relational database instance that is used in the mapping. Query forests consist of query trees that have only execution nodes for a single data source and are created by keeping all the execution nodes for a single source and only edges that connect two execution nodes for the same source in each query tree within the query forest.

The processing of the exemplary embodiment then processes each query tree within the query forest in turn. The processing next selects, at step 404, a first query tree in the query forest. The processing then determines, at step 406, if the selected query tree only has one node. If the selected query tree only has one node, there is nothing to optimize, as noted at step 408, and processing continues by determining, at step 424, if this is the last tree in the query forest. The processing then continues as is described below.

If it is determined that the selected query tree did not have only one node, the processing of the exemplary embodiment next determines, at step 410, if the selected tree has only two nodes. If the selected tree is determined to have two nodes, these two nodes must be in a parent-child relationship and the two queries specified by these two execution nodes are combined, at step 412, and processing continues by determining, at step 424, if this is the last tree in the query forest. The processing then continues as is described below.

If it is determined that the selected query tree does not have only two nodes, the selected query tree is then analyzed to estimate which path of the tree is most beneficial to optimize. The processing continues by assigning, at step, 416, to each non-leaf node within the selected query tree a result size estimate. The result size estimate is the estimated size of the result set that will be produced by the database query specified by that non-leaf node. The result size that is assigned in this step is able to be estimated by one of several methods. One method of estimating the result size is to assume a pre-determined percentage, such as ten percent (10%) of rows of the target table will be selected by that query. This percentage is able to vary among different target tables, based upon various criteria, or a single percentage can be used for all tables. The assigned value based on this estimate is then the assumed percentage multiplied by the size of the target table. Alternative methods for estimating result set sizes use RDBMS generated statistics that are stored in the query statistics storage 210.

The processing of the exemplary embodiment then assigns, at step 418, the product of the result size estimate for each of the ancestor nodes of that leaf to each leaf node of the selected query tree. This results in assigning each leaf an estimate of the resources that will be required by the query path to that leaf. The processing then selects, at step 420, the leaf with the highest assigned product. The path from the root node of the selected query tree to this leaf is estimated to be the most beneficial to optimize by combining the queries along this path into a single outer-union query. The processing next merges, at step 422, the queries from the root of the selected query tree to the selected leaf. The processing of the exemplary embodiment used to merge multiple queries into a single outer union query is described in detail below. After the optimization of creating a first merged query for a query tree, the optimized execution nodes of the merged query and the edges linking those nodes to other execution nodes of the query tree are removed from the query tree. The remaining execution nodes and edges then form, at step 423, a second set of query trees, referred to as reduced query trees. The same optimization methodology is applied to the second set of query trees in order to continue the optimization process. This process is repeated until optimization is complete.

The processing next determines if the selected query tree is the last query tree in the query forest. If the selected query tree is the last query tree in the query forest, the query optimization processing halts. If the selected query tree is not the last query tree in the query forest, the processing advances by selecting, at step 426, the next query tree. The processing then repeats by processing this query tree, as is described above.

Query Merging Processing

The processing of the exemplary embodiment of the present invention includes merging parameterized SQL queries from multiple execution nodes of a query tree into a single outer-union query. An exemplary parameterized query 500 as is processed by the exemplary embodiment is illustrated in FIG. 5. The exemplary parameterized SQL query 500 is an SQL SELECT command that is denoted as Qm and that specifies columns to be selected from a table Tk with a specified list of predicates Pmi. Each Pmi is a predicate of the form "L op P" where L and R are column names, constants or '?' markers, and op is a comparison operator.

An exemplary binding object 600 as is used by an exemplary embodiment of the present invention is illustrated in FIG. 6. The parameterized SQL queries 500 have associated binding objects. Each binding object 600 is an ordered list of simple bindings of the form (query ID, column), as is illustrated. The number of simple bindings in a particular binding object is equal to the number of '?' symbols in its associated query, each simple binding is associated with one '?' symbol of the query, based on the order of their occurrence in the binding list and the query, respectively. Each simple bindings specifies from where the input for the corresponding '?' marker comes from, i.e., the query and the column of the result set for that query. The effect of this correspondence is that, at run time, the data value extracted from the specified column of the output table produced by the specified query of the i-th simple binding in the list is used as actual parameter, instead of the i-th '?' symbol.

An exemplary outer-union SQL query 700 as is generated by the exemplary embodiment of the present invention from parameterized queries of the form illustrated for the exemplary parameterized query 500 and from binding objects of the form illustrated for the exemplary binding object 600, is illustrated in FIG. 7. The QID column specified in the exemplary outer-union query is used as a virtual query identifier (query ID). Each of the original parameterized SQL queries is assigned a query ID in sequential ascending order, starting from one (1) in the exemplary embodiment. The predicates on each of the internal queries are modified by incorporating information contained in the bindings. The predicates are modified by replacing each '?' marker with the corresponding column name. In order to accommodate the fact that column names may not be unique across database tables, each column name is preceded with a variable name and that construction is declared in the FROM clause of the exemplary outer-union SQL query 700. The ORDER BY clause of the exemplary outer-union SQL query 700 is included to ensure that the rows that correspond to related elements are grouped together in the output. This is accomplished by sorting on all the columns that are used in the binding objects and on the query identifier QID.

The processing of the exemplary embodiment generates the outer-union query by receiving a number of queries Q1 through Qn. For each Qi within the received queries, the processing first rewrites each query Qi into Q'i. The SELECT clause of Q'1 is formed by inserting the constant i on the first position, followed by (k1+k2+ . . . +ki−1) NULLs. The processing then appends to those inserted values the list of columns from the SELECT clause of Qi followed by (ki+1+ . . . +kN) NULLs. The processing next processes each simple binding (j, Cjq) in the list of Bi, which are bindings that correspond to query Qi, For each simple binding (j, Cjq) in list Bi, the NULL in the SELECT clause in the position 1+k1+k2+ . . . +ki−1+q is replaced with Ciq and a comma followed by a variable declaration Tj Xj is appended to the FROM clause.

A left parenthesis is inserted into the WHERE clause of query Q'i. This inserted parenthesis is followed by the condition in the WHERE statement of the received query Qi, wherein '?' symbols, that correspond to simple bindings that refer to queries being merged, are replaced by an expression of the form x.C. The expression x.C is formed by replacing the j-th occurrence of a '?' symbol with the symbol 'xj.Cjq', where Cjq is the column name from the SELECT clause of the received Qi. A right parenthesis is then appended to the WHERE clause of Q'i.

Each simple binding, which is of the form (j, Cjq), in the list Bj is processed by adding an AND connector to the WHERE clause of query Q'1, followed by a left parenthesis that is followed by the modified condition of query Q'j. This is then followed by a right parenthesis. For each simple binding in the list Bj, all the variable declarations that are mentioned in the conditions of Q'i are added to the FROM clause of Q'i, if that variable definition is not already present.

An ORDER BY parameter list (referred to as "OrderByList") is then constructed by initializing OrderByList to an empty list. Then, for each "i" between 1 and N, each simple binding (j, Ciq) in the list Bi is processed by appending to OrderByList the column name Xi_Ciq. The value of QID is then appended to OrderByList.

Each query optimization combines a set of queries where each query corresponds to an execution node in the query tree. The first execution node that contains queries to be merged into an outer-union query will be replaced with an outer-union execution node, which contains the generated outer union query, and with an associated virtual execution node. This virtual execution node is attached as a child node of the outer-union node. Virtual execution nodes also replace the other execution nodes on the selected path of nodes specifying queries to be merged or combined into the generated outer-union query. The output columns of each virtual node are connected to the corresponding columns of the output of the outer-union execution node.

An optimized tagging tree is created by replacing each execution node with its optimized version. The optimized version is a mapping that is either a virtual node or a combination of an outer-union node with another virtual execution node, as described above. This replacement is performed for the nodes along selected paths within query trees within the query forest that were selected to be optimized by merging the queries along that path, as described above. Non optimized nodes are not modified by this processing.

Run-Time Engine Processing

The engine processor 230 of the exemplary embodiment uses a depth-first tree walk to generate an output XML file. The current record of each execution node can be separately processed because the relationship of the query is record-based. The operation of the engine processor 230 executes RDBMS queries in a conventional manner and receives a result set that is produced by the RDBMS. The database query for each execution node in the exemplary embodiment is separately executed as the depth-first tree walk progresses. As each execution node query is executed, that execution node points to a result set produced by the RDBMS 224. The processing of the extract and tag data processor 220 further maintains a cursor point for each execution node that points to the current tuple (i.e., row) of the result set. The processing traverses the cursors for each execution node through the produced result sets to get the data and render the output as XML text or generate SAX (where SAX: Simple API for XML) events as output.

Execution nodes that have been replaced with virtual nodes get data from the result set produced by the outer-union query executed by the outer-union query execution node. Virtual nodes retrieve data from the outer union query result set based upon the query ID data field, i.e., the column. Virtual nodes are configured with a definition of the start column, the end column and the query ID. The query IDs, i.e., the values of the first column in the exemplary embodiment, of records produced by an outer-union query are examined as they are produced and the corresponding virtual execution node, i.e., the virtual execution node associated with that query ID, is notified that a record is available. The virtual execution node then copies the relevant portion of the produced record, i.e., from start column to end column.

A data transformation algorithm of the extract and tag data processor 220 performs a depth-first traversal of the tagging tree. As each tagging node is encountered in this traversal, an XML open-tag is produced and inserted into the XML output document with the node's name as the tag. When a data node is encountered, a corresponding XML fragment is produced and inserted into the XML output document with the value taken from the current value of the column of the results set produced by the query specified by the associated execution node, as indicated by the binding. When processing of a tagging node is completed, an XML closing tag is generated and inserted into the XML output document with the element name as the tag. When an execution node is encountered, the processing depends on the type of execution node that is encountered. There are three kinds of execution nodes processed by the exemplary embodiments: 1) Outer-union execution nodes; 2) virtual execution nodes, and 3) regular execution nodes. The regular execution nodes correspond to the remaining, non-optimized, i.e., non-combined, queries of the original query tree.

The processing performed by the runtime engine 230 for regular and outer-union execution node executes the SQL query specified by that node to generate a result set. A cursor is initialized to point to the first row of that result set. The first child of the current node is traversed for every row retrieved by this query. When the result set has been completely produced, the processing traverses back to the parent node.

The processing performed by the runtime engine 230 for outer-union queries executes the SQL command to generate a result set. The processing then receives the first row of the result set and traverses to the first child of this branch of the query tree. The processing then traverses back to the parent node at the end of the result set.

The processing performed by the runtime engine 230 for virtual execution nodes generates a new virtual data set if the query ID of the current tuple in the outer-union result set is the same as the query ID. The new virtual data set only has one tuple that is created by retrieving the data of the corresponding columns from the outer-union tuple. The processing then retrieves another tuple from the outer-union result set and uses this new tuple as the current tuple. Tree traversal then continues.

The processing of virtual execution nodes end the current data set and moves back to its parent node if the query ID is smaller than Query ID. It is to be noted that a query ID is not larger than the current query during the traversal of the sub-tree rooted at the current node. The current data set then ends and the processing moves back to its parent node.

The processing of a virtual execution node closes all virtual data sets if there are no more tuples in the results set produced by the outer-union execution node.

RDBMS to XML Publishing Example

The exemplary embodiments of the present invention allow the publishing of data that is stored in an RDBMS to an XML formatted document. The following is an example of such an operation based upon the exemplary tagging tree 100 described above. The two exemplary queries 800 of the two execution nodes of the exemplary tagging tree 100 are illustrated in FIG. 8. These two exemplary queries 800 include a Q1 query 140 and a Q2 query 142. Each of these two exemplary queries 800 are shown as retrieving data from a relational database table named "po" and another relational database table named "lineitem," respectively. The Q2 query 142 is shown to depend upon the results produced from the Q1 query 140.

An exemplary outer-union query 900 as produced from the two exemplary queries 800 by an exemplary embodiment of the present invention is illustrated in FIG. 9. The exemplary outer-union query 900 is produced from the two exemplary queries 800 by performing the processing described above. The outer-union query 900 produces an outer union result set called "temp" in this example.

Figure 10:
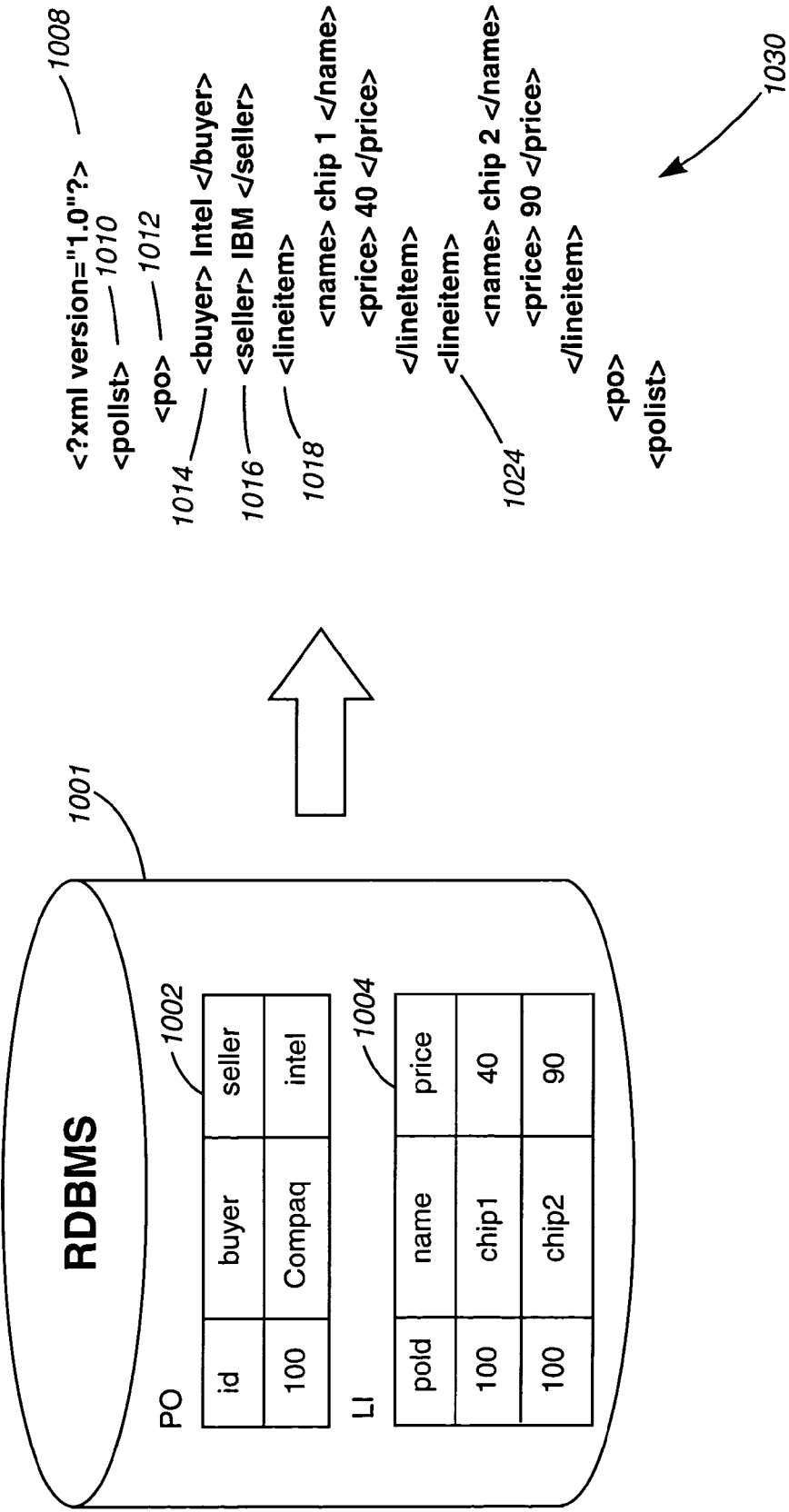
FIG. 10 illustrates an exemplary relational database content and generated XML document that contains the hierarchical data corresponding to the tagging illustrated in FIG. 1, according to an exemplary embodiment of the present invention.

An exemplary RDBMS set of tables and a resulting published XML document generated by an exemplary embodiment of the present invention is illustrated in FIG. 10. The RDBMS 1001 in this example contains a number of tables. Illustrated in the RDBMS 1001 in this example are two tables that contain a description of one purchase order. These two trivially simple tables are illustrated here for ease of understanding of the publishing process. The exemplary embodiment operates with one or more RDBMSs that maintain complex database tables. These two tables could also be visualized as results sets that would be produced by conventional processing, which would execute the two exemplary queries 800 in series to produce these result sets from a more populated set of database tables. The operation of the exemplary embodiment would not, however, explicitly produce these results sets but rather produce the outer-union result set described below.

The "PO" table 1002 in this illustration is shown to contain one row that contains a description of a purchase order that is stored in the RDBMS 1001. The "PO" table 1002 corresponds to the "po" table of the Q1 query 140. This purchase order has an ID element containing "100," which is an identification number used only by the RDBMS 1001 to identify this purchase order and related elements in the same or other tables maintained by this RDMBS 1001. This purchase order also has a buyer element containing "Compaq" and a seller element containing "Intel." An "LI" result set 1004, which corresponds to the "lineitem" result set of the second query 142, contains two rows that correspond to the "poid" of "100," as was identified in the "PO" result set 1002. The name and price for the items on this purchase order is similarly contained in a second and third row of the "LI" table 1004.

The data in the RDBMS 1001 is published to a generated XML document 1030 as illustrated. The structure of the generated XML document 1030 is defined by the exemplary tagging tree 100. A first tag 1008 identifies the XML version in use by this document. A root tag 1010 specifies the root name for this structured document, as is defined by the root tagging node 102 of the exemplary tagging tree 100. Within the "polist" section of this document is a subsection with a "po" tag 1012. The "po" tag corresponds to the "PO" tagging node 106. The "buyer" element 1014 and "seller" element 1016 correspond to data contained in the "PO" table 1002. The "ID" element, which identifies the purchase order for the RDBMS 1001 is not included in this structured XML document since the data relationships are denoted by the structure of the document and not by record identifiers.

The exemplary XML document contains two "lineitem" sections that begin with a first "lineitem" tag 1118 and a second "lineitem" tag 1124. The "lineitem" tags corresponds to the "lineitem" tagging node 116 of the exemplary tagging tree 100, and is replicated for each iteration of a "lineitem" record retrieved from the target database. All tags in this XML document have corresponding closing tags as is known to ordinary practitioners in the relevant arts.

An exemplary outer-union results set 1100 as is produced by an exemplary embodiment of the present invention in the course of generating the exemplary XML document 1030 described above is illustrated in FIG. 11. The outer-union results set is produced by the exemplary embodiment by executing the exemplary outer-union query 900 upon the RDMBS 1001. The exemplary outer-union results set 1100 has a first row 1116 that contains the results that were retrieved from the first table 1002. The second row 1118 and third row 1120 correspond to the data retrieved from the second table 1004. The outer-union results set 1100 has a "Qid" column 1102 that stores the QID values used by the processing of the exemplary embodiment, as are described herein. The "po_ID" column contains the ID values that are also used to order the outer-union results set in addition to the "Qid" column in this example. The po_buyer column 1108 and po_seller column 1110 contain data retrieved from the "PO" table 1102 and therefore only contain non-null data in the first row 1116. The second row 1118 and the third row 1120 contain data retrieved from the second table 1004, and therefore have "null" values in these columns. The "item name" column 1112 and "item_price" column 1114 contain the data retrieved from the second table 1004, and therefore the first row 1116 has "null" values in these columns.

The processing of the exemplary embodiment produced an optimized tagging tree that corresponds to the exemplary tagging tree 100. This optimized tagging tree replaced the execution nodes of the exemplary tagging tree 100 with virtual execution nodes. The virtual execution nodes extract data from the outer query results set 1100 instead of executing a separate RDBMS query for each execution node. This advantageously reduces the number of RDBMS queries that are submitted to produce this output hierarchical data structure.

The outer-union query 900 as used by exemplary embodiments of the present invention advantageously combines multiple data queries to an RDBMS, such as the first query 140 and second query 142, into a single data query. This combination is performed even though the second query 142 depends upon results from the first query 140. This combination of queries advantageously reduces the processing overhead that accompanies each separate database query that is made to an RDBMS. This operation further serves to reduce data communications network latencies for RDBMS implementations that have components located at remote locations and that communicate over a communications network. Combining multiple queries into a single query where the multiple queries include a subsequent query depends upon a result of a previous query advantageously further reduces the processing time required to create and execute that subsequent query. Embodiments of the present invention are able to be advantageously adapted to use in application for presenting data over the World Wide Web, performing intelligent data searching, data management, data migration of historical data, business-to-business message exchange, and content management.

A further advantage of the exemplary embodiments of the present invention is the separate functions used to generate optimized data query operation, i.e., the processing that is performed by the optimizer 202, and the execution of those optimized data query operations. This allows the optimized data queries to be used an arbitrarily large number of time to perform the desired data conversion, and thereby allow the optimization processing to be amortized over those several executions of the optimized query.

Figure 12:
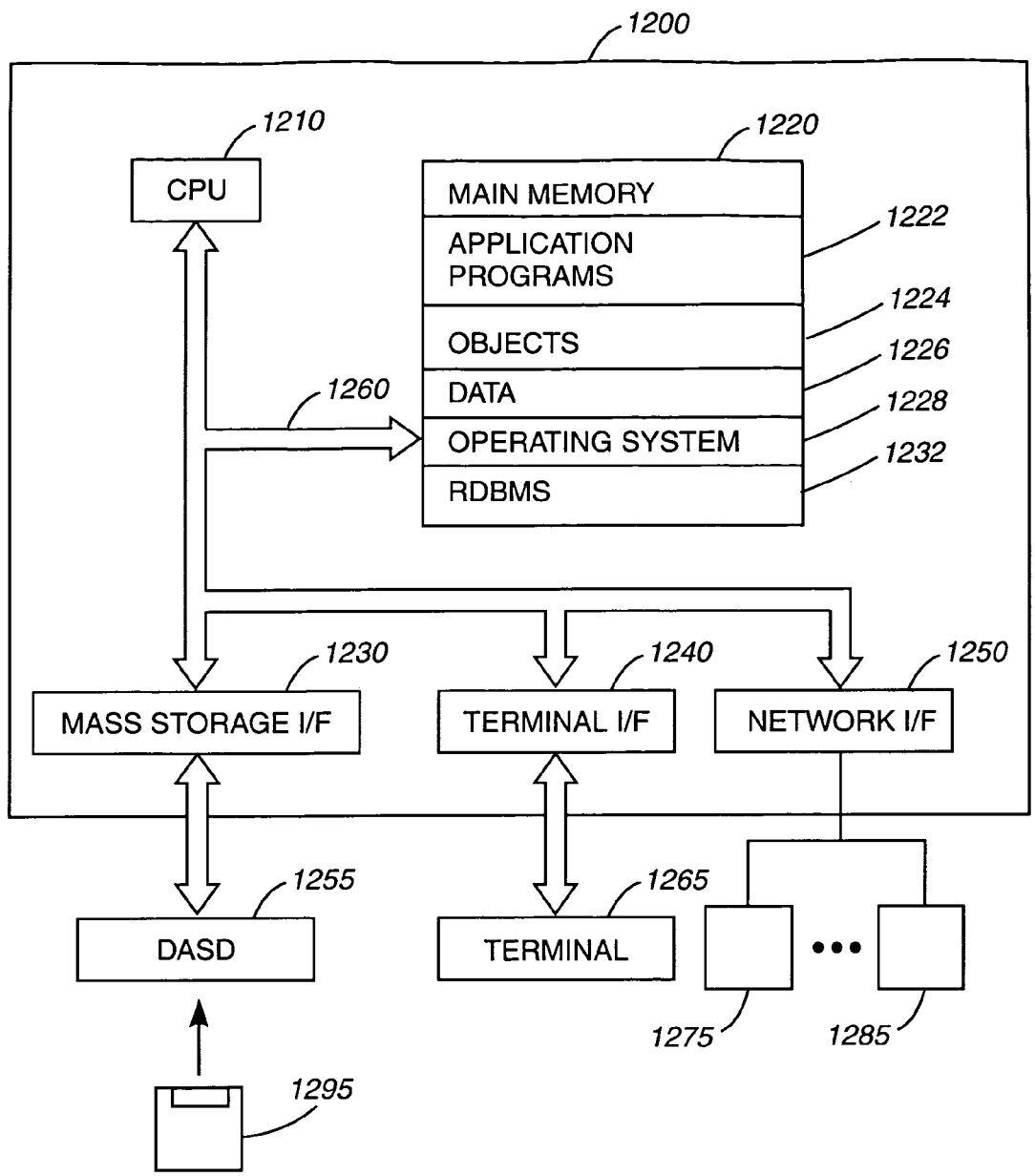
FIG. 12 is a block diagram of a computer processing node, according to an exemplary embodiment of the present invention.

A block diagram depicting a computer system 1200, which is a processing circuit as used by an exemplary embodiment of the present invention is illustrated in FIG. 12. Processing circuits as understood in this specification include a broad range of processors, including any variety of processing circuit or computer system that is located at a single location, or distributed over several identifiable processors. These several processors are further able to be collocated or physically dispersed within a local area or a geographically widespread area. Any suitably configured processing system is also able to be used by embodiments of the present invention. The computer system 1200 has a processor 1210 that is connected to a main memory 1220, mass storage interface 1230, terminal interface 1240 and network interface 1250. A system bus 1260 interconnects these system components. Mass storage interface 1230 is used to connect mass storage devices, such as DASD device 1255, to the computer system 1200. One specific type of DASD device is a floppy disk drive, which may be used to store data to and read data from a floppy diskette 1295.

Main Memory 1220 contains application programs 1222, objects 1224, data 1226 and an operating system image 1228. Although illustrated as concurrently resident in main memory 1220, it is clear that the applications programs 1222, objects 1224, data 1226 and operating system 1228 are not required to be completely resident in the main memory 1220 at all times or even at the same time. Computer system 1200 utilizes conventional virtual addressing mechanisms to allow programs to behave as if they have access to a large, single storage entity, referred to herein as a computer system memory, instead of access to multiple, smaller storage entities such as main memory 1220 and DASD device 1255. Note, that the term "computer system memory" is used herein to generically refer to the entire virtual memory of computer system 1200.

Operating system 1228 is a suitable multitasking operating system. Operating system 1228 includes a DASD management user interface program to manage access through the mass storage interface 1230. Embodiments of the present invention utilize architectures, such as an object oriented framework mechanism, that allows instructions of the components of operating system 1228 to be executed on any processor within computer 1200.

Although only one CPU 1202 is illustrated for computer 1202, computer systems with multiple CPUs can be used equally effectively. Embodiments of the present invention incorporate interfaces that each include separate, fully programmed microprocessors that are used to off-load processing from the CPU 1202. Terminal interface 1208 is used to directly connect one or more terminals 1218 to computer system 1200. These terminals 1218, which are able to be non-intelligent or fully programmable workstations, are used to allow system administrators and users to communicate with computer system 1200.

Network interface 1250 is used to connect other computer systems or group members, e.g., Station A 1275 and Station B 1285, to computer system 1200. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 1295, CD ROM, or other form of recordable media, or via any type of electronic transmission mechanism.

Embodiments of the present invention include a Relational DataBase Management System (RDBMS) 1232. RDBMS 1232 is a suitable relational database manager, such as relational database managers that process versions of the Structure Query Language (SQL).

Non-limiting Software and Hardware Examples

Embodiments of the invention can be implemented as a program product for use with a computer system such as, for example, the cluster computing environment shown in FIG. 12 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for transferring data from a database into a hierarchical structure, the method comprising:
    accepting a tagging tree, the tagging tree comprising at least one tagging node that each specifies a field in a hierarchical structure, a plurality of execution nodes that each specifies a database query command for at least one data object, and at least one data node that each specifies a binding between each of the at least one data object and at least one field specified in the at least one tagging node;
    creating at least one query tree, each query tree within the at least one query tree comprising the plurality of execution nodes configured with parent child relationships similar to the hierarchical structure;
    combining at least two of the plurality of execution nodes into at least one composite database query, wherein each of the at least one composite database query specifies a same data source;
    estimating, for each non-leaf node of at least one query tree within the at least one query tree, an estimated query result size for each non-leaf node of the at least one query tree;
    assigning a product of estimated sizes to each leaf node of the at least one query tree, the product of estimated sizes for a particular leaf node of the at least one query tree equaling a product of all estimated query result sizes that were estimated for each ancestor non-leaf node of the particular leaf node of the at least one query tree;
    selecting a highest value leaf node, the highest value leaf node having a largest product of estimated sizes;
    forming the composite database query by merging the database queries specified by ancestor non-leaf nodes of the highest value leaf node;
    executing the single database query to retrieve a set of data objects; and
    creating an output having a composite hierarchical structure with a plurality of fields, the output being created by placing at least one data object within the set of data objects into at least one field of the plurality of fields based upon the at least one data node.

2. The method according to claim 1, wherein the composite database query comprises an outer-union SQL query.

3. The method according to claim 1, further comprising:
    creating a set of reduced query trees, wherein the set of reduced query trees comprise the plurality of execution nodes with the combined at least two of the plurality of execution nodes removed;
    combining at least an additional two of the plurality of execution nodes within the set of reduced query trees into at least one additional composite database query, wherein each of the at least one additional composite database query specifies a second data source; and
    executing the additional single database query to retrieve an additional set of data objects,
    wherein creating the output further comprises placing at least one data object within the additional set of data objects into at least additional one field of the plurality of fields based upon the at least one data node.

4. The method according to claim 1, further comprising defining at least one mapping, wherein each of the at least one mapping defines a correspondence between data produced by a database query command within the at least two of the plurality of execution nodes and data objects within the set of objects, and wherein the creating an output comprises placing at least one data object within the set of data objects into at least one field of the plurality of fields based upon the at least one mapping.

5. The method according to claim 4, further comprising defining at least one modified tagging tree by replacing at least one execution node with at least one mapping.

6. The method according to claim 1, wherein the estimating comprises multiplying a size of a target table by a pre-determined percentage.

7. A hierarchical data structure generator for transferring data from a database into a hierarchical structure, the hierarchical data structure generator comprising:
an analyze tagging tree processor for accepting a tagging tree, the tagging tree comprising at least one tagging node that each specifies a field in a hierarchical structure, a plurality of execution nodes that each specifies a database query command for at least one data object, and at least one data node that each specifies a binding between each of the at least one data object and at least one field specified in the at least one tagging node, the analyze tagging tree processor further for creating at least one query tree, each query tree within the at least one query tree comprising the plurality of execution nodes configured with parent child relationships similar to the hierarchical structure;
a composite query generator for:
combining at least two of the plurality of execution nodes into at least one composite database query, wherein each of the at least one composite database query specifies a same data source;
estimating, for each non-leaf node of at least one particular query tree within the at least one query tree, an estimated query result size for each non-leaf node of the at least one particular query tree;
assigning a product of estimated sizes to each leaf node of the at least one particular query tree, the product of estimated sizes for a particular leaf node of the at least one particular query tree equaling a product of all estimated query result sizes that were estimated for each ancestor non-leaf node of the particular leaf node of the at least one particular query tree;
selecting a highest value leaf node, the highest value leaf node having a largest product of estimated sizes; and
forming the composite database query by merging the database queries specified by ancestor non-leaf nodes of the highest value leaf node;
a runtime engine for executing the single database query to retrieve a set of data objects; and
an extract and tag data processor for creating an output having a composite hierarchical structure with a plurality of fields, the output being created by placing at least one data object within the set of data objects into at least one field of the plurality of fields based upon the at least one data node.

8. The hierarchical data structure generator according to claim 7, wherein the composite database query generator generates an outer-union SQL query.

9. The hierarchical data structure generator according to claim 7, wherein:
the analyze tagging tree processor further creates a set of reduced query trees, wherein the set of reduced query trees comprise the plurality of execution nodes with the combined at least two of the plurality of execution nodes removed;
the composite query generator further combines at least an additional two of the plurality of execution nodes within the set of reduced query trees into at least one additional composite database query, wherein each of the at least one additional composite database query specifies a second data source;
the runtime engine further executes the additional single database query to retrieve an additional set of data objects, and
an extract and tag data processor further creates the output by placing at least one data object within the additional set of data objects into at least additional one field of the plurality of fields based upon the at least one data node.

10. The hierarchical data structure generator according to claim 7, wherein the composite database query generator further defines at least one mapping, wherein each of the at least one mapping defines a correspondence between data produced by a database query command within the at least two of the plurality of execution nodes and data objects within the set of objects, and wherein the extract and tag data processor further places at least one data object within the set of data objects into at least one field of the plurality of fields based upon the at least one mapping.

11. The hierarchical data structure generator according to claim 10, wherein the composite database query generator further defines at least one modified tagging tree by replacing at least one execution node with at least one mapping.

12. The hierarchical data structure generator according to claim 7, wherein the estimated query result size is estimated by multiplying a size of a target table by a pre-determined percentage.

13. A computer program product for transferring data from a database into a hierarchical structure, the computer program product comprising:
a storage medium readable by a processing circuit and storing computer Instructions for execution by the processing circuit for performing a method comprising:
accepting a tagging tree, the tagging tree comprising at least one tagging node that each specifies a field in a hierarchical structure, a plurality of execution nodes that each specifies a database query command for at least one data object, and at least one data node that each specifies a binding between each of the at least one data object and at least one field specified in the at least one tagging node;
creating at least one query tree, each query tree within the at least one query tree comprising the plurality of execution nodes configured with parent child relationships similar to the hierarchical structure;
combining at least two of the plurality of execution nodes into at least one composite database query, wherein each of the at least one composite database query specifies a same data source;
estimating, for each non-leaf node of at least one particular query tree within the at least one query tree, an estimated query result size for each non-leaf node of the at least one particular query tree;
assigning a product of estimated sizes to each leaf node of the at least one particular query tree, the product of estimated sizes for a particular leaf node of the at least one particular query tree equaling a product of all estimated query result sizes that were estimated for each ancestor non-leaf node of the particular leaf node of the query tree;
selecting a highest value leaf node, the highest value leaf node having a largest product of estimated sizes;
forming the composite database query by merging the database queries specified by ancestor non-leaf nodes of the highest value leaf node;

executing the single database query to retrieve a set of data objects; and creating an output having a composite hierarchical structure with a plurality of fields, the output being created by placing at least one data object within the set of data objects into at least one field of the plurality of fields based upon the at least one data node.

14. The computer program product according to claim 13, wherein the composite database query comprises an outer-union SQL query.

15. The computer program product according to claim 13, further comprising instructions for:

creating a set of reduced query trees, wherein the set of reduced query trees comprise the plurality of execution nodes with the combined at least two of the plurality of execution nodes removed;

combining at least an additional two of the plurality of execution nodes within the set of reduced query trees into at least one additional composite database query, wherein each of the at least one additional composite database query specifies a second data source; and executing the additional single database query to retrieve an additional set of data objects, wherein creating the output further comprises placing at least one data object within the additional set of data objects into at least additional one field of the plurality of fields based upon the at least one data node.

16. The computer program product according to claim 13, further comprising instructions for defining at least one mapping, wherein each of the at least one mapping defines a correspondence between data produced by a database query command within the at least two of the plurality of execution nodes and data objects within the set of objects, and wherein the instructions for creating an output comprise placing at least one data object within the set of data objects into at least one field of the plurality of fields based upon the at least one mapping.

17. The computer program product according to claim 16, further comprising instructions for defining at least one modified tagging tree by replacing at least one execution node with at least one mapping.

* * * * *